2,414,676

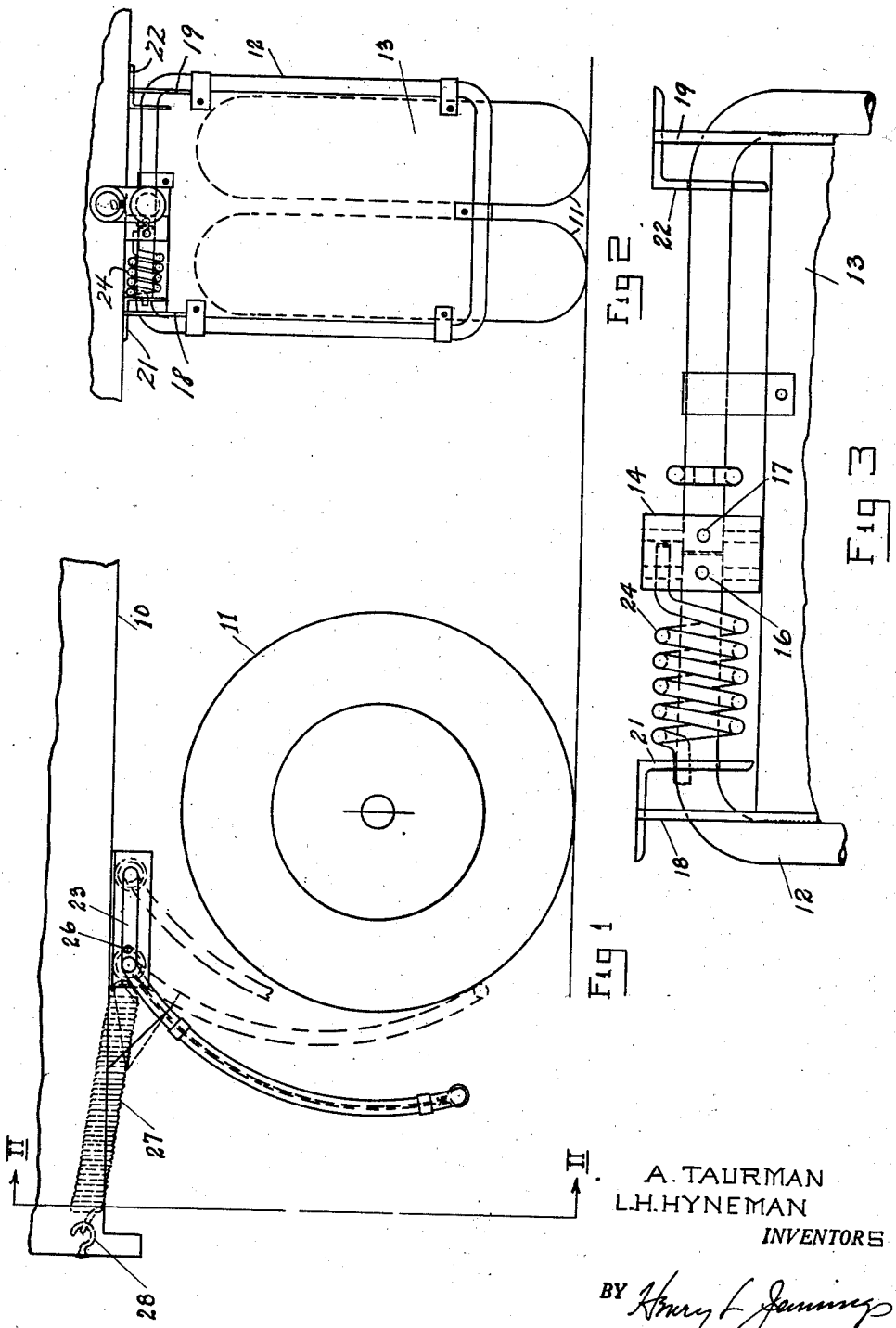
Jan. 21, 1947. A. TAURMAN ET AL 2,414,676
WHEEL GUARD
Filed April 16, 1945
A. TAURMAN
L. H. HYNEMAN
INVENTORS Patented Jan. 21, 1947

UNITED STATES PATENT OFFICE 2,414,676

WHEEL GUARD

Alphonso Taurman, Birmingham, Ala., and Louis H. Hyneman, Atlanta, Ga.

Application April 16, 1945, Serial No. 588,534

5 Claims. (Cl. 280—160)

This invention relates to a wheel guard or shield for vehicles, especially for the heavy type of motor vehicle and trailers, not provided with fenders, and has for an object the provision of a wheel guard which shall be effective to intercept water, mud, stones and the like which would otherwise be thrown toward the rear of the vehicle, endangering motorists and others at the rear of the vehicle.

A further object of our invention is the provision of a wheel guard of the character designated which shall be adapted to yield and move forwardly upon the application of pressure at the rear thereof as when the vehicle is backed into loading position with the wheels against a curb or platform.

As is well known in the art to which our invention relates it has hitherto been considered impractical to provide a rigid or semi-rigid wheel guard at the rear of the wheels of a heavy vehicle due to the fact that when such a vehicle is backed into a curb or platform the wheel guard would be bent forwardly and damaged or broken. A flexible wheel guard has also been found impractical due to the fact that, at high speeds when most needed, the wheel guard would be held out in a horizontal position by the relative movement of the air. Consequently it has become the universal practice to leave such wheels unguarded. Many serious accidents have been caused by stones and other foreign material picked up by the tires and thrown rearwardly by such unshielded wheels.

These and other difficulties are overcome in accordance with our invention in which we provide a wheel guard which is pivotally mounted on the vehicle at the rear of the wheel and is biased rearwardly against a stop. The pivot mounting is further disposed for forward movement on the vehicle and is held in its rearward position by a spring.

A device embodying features of our invention is illustrated in the accompanying drawing, forming a part hereof, wherein Fig. 1 is a side elevation showing a fragment of a vehicle having our improved wheel guard applied thereto;

Fig. 2 is a rear view taken along the lines II—II of Fig. 1; and

Fig. 3 is an enlarged view of the top part of the frame showing the spring bracket and stop members.

Referring to the drawing for a better understanding of our invention, we show a fragment of the rear of a vehicle 10 and a pair of dual wheels 11. Mounted to the rear of the wheels 11 is our improved wheel guard which, as shown, comprises a rectangular tubular frame 12 having a suitable covering 13. The ends of the tube forming the frame 12 are joined together at the top by means of a collar 14 with pins 16 and 17 passing through the collar and the ends of the tube to join them together. Joined to the top of the frame 12 at the sides, are stop members 18 and 19 to limit the rearward swing of the guard and to hold it in the proper spaced relation with respect to the wheels 11.

Secured to the body 10 above the wheels 11 are mounting brackets 21 and 22. The mounting brackets 21 and 22 are provided with elongated slots 23 through which the ends of the tube 12 forming the frame of the guard pass. A coil spring 24 surrounds the tube 12 and has one end engaged in the collar 14 as shown in Fig. 3 and the other end engages the upper side of the slot 23 as shown at 26 in Fig. 1. The spring 24 is placed under the desired tension when the guard is mounted on the brackets 21 by placing the left hand end, as viewed in Fig. 2, in slot 23, and the right hand end in collar 14 and using a suitable tool to turn the collar. When the desired tension is reached, the pins 16 and 17 are put in place.

Also joined to the top of the frame 12, centrally thereof, is a spring 27 which has its other end secured to a hook 28 at the rear of the vehicle. The spring 27 is under tension whereby the frame is normally held to its full line position shown in Fig. 1, but, upon the application of pressure, as when the vehicle is backed against a curb or platform, the frame will yield and move forwardly to the dotted line position shown in Fig. 1 so as to lie against the wheel 11 and not be damaged.

From the foregoing it will be apparent that we have devised a guard for vehicle wheels, which is simple of design, economical of construction, and one which is adapted to yield upon pressure from a curb or platform and thus avoid damage.

While we have shown our invention in but one form, it will be obvious to those skilled in the art that it is not so limited, but is susceptible of various changes and modifications, without departing from the spirit thereof, and we desire, therefore, that only such limitations shall be placed thereupon as are specifically set forth in the appended claims.

What we claim is:

1. In a guard for a vehicle wheel, a mounting bracket having elongated slots therein in which the guard is pivotally mounted, a spring included in the mounting and coacting with the guard to swing it rearwardly in spaced relation with the wheel, stop means for limiting the rearward swing of the guard, and yieldable means coacting with the guard to hold it normally in its rearwardmost position and to provide for forward movement of the mounting and the guard responsive to pressure.

2. In a guard for the rear wheel of a vehicle having an overhanging body, mounting brackets having elongated slots therein and secured to the body over the wheel, a wheel guard frame mounted in the slots to swing downwardly behind the wheel and to be moved forwardly and rearwardly in the slots, a spring coacting with the mounting brackets and the frame to swing the frame rearwardly of the wheel, stop means to limit said swinging movement, and a second spring coacting with the body and the frame to bias the frame rearwardly in the slots, said slots extending forwardly a sufficient distance whereby when pressure is applied to the frame, the guard is moved forwardly in the slots and against the wheel.

3. A wheel guard as set forth in claim 2 in which the frame for the guard is made of metal tubing bent in the form of a rectangle with the ends joined together at the top by means of a collar and pins, and in which the collar serves as an anchor for one end of the first mentioned spring, and one of the mounting brackets the other.

4. In a guard for the rear wheel of a vehicle having an overhanging body, a pair of spaced parallel brackets on the body having elongated slots therein extending longitudinally thereof, a wheel guard having a frame member extending across the brackets and mounted in the slots to hinge the guard to the brackets, a coil spring surrounding the frame member and having one end engaged therewith and the other slidingly engaged in one of the slots to bias the guard rearwardly of the wheel, stop members to limit the rearward swing of the guard, and a second spring having one end connected to the body rearwardly of the guard and the other end connected to the guard to bias the guard toward the rearward ends of the slots.

5. A device as set forth in claim 4 in which means are provided for adjusting the tension of the coil spring surrounding the frame member.

ALPHONSO TAURMAN.
LOUIS H. HYNEMAN.